DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 9, 1971

884 O.G. 434

T884,007
BULK YARN AND PROCESS
Donald Bowker Cook, R.D. 1, Box 126,
Hockessin, Del. 19707
Filed July 30, 1970, Ser. No. 59,714
Int. Cl. D02g *3/04, 3/24*
U.S. Cl. 57—140
No Drawing. 6 Pages Specification

The bulk level of a twist-set, nylon, carpet yarn spun and twisted from blended, crimped staple fibers of different deniers is increased without loss of tuft definition by setting the crimp in about half of the fibers while in the form of crimped tow. Usually, the fibers in one or more but not all deniers are crimp-set. About half of the blend is of fibers with a common denier per filament of less than 15 and best results have been achieved by setting the crimp in only that group of fibers.